Aug. 18, 1931.  F. W. HIGHFIELD  1,819,097
RADIAL CYLINDER INTERNAL COMBUSTION ENGINE
Filed Nov. 14, 1929  2 Sheets-Sheet 1

Patented Aug. 18, 1931

1,819,097

UNITED STATES PATENT OFFICE

FRANK WOOTTON HIGHFIELD, OF COVENTRY, ENGLAND

RADIAL-CYLINDER INTERNAL COMBUSTION ENGINE

Application filed November 14, 1929, Serial No. 407,250, and in Great Britain December 29, 1928.

This invention relates to four-cycle internal combustion engines of the three cylinder radial type.

In such engines as hitherto constructed it is usual to space the cylinders at 120° from one another and to actuate the inlet and outlet valves by separate cams or by different parts of a single cam member operating at one half engine speed.

The object of the present invention is to effect a simplification in the valve actuating mechanism of such engines, and for this purpose the invention consists in an internal combustion engine of the type referred to having a single cam whereof the same part is arranged to open simultaneously the exhaust valve of one cylinder and the inlet valve of the next preceding cylinder in the order of firing.

In carrying the invention into effect, the cylinders are equally spaced at 120° apart from one another and they may either rotate about a fixed axis, or they may be fixed in relation to a rotary crank shaft. If the cylinders in such an engine be designated by the numerals 1. 2. 3. the firing order would be 1. 3. 2. Moreover, in most four-cycle engines of this kind, the interval between the opening of the exhaust valve and the opening of the inlet valve varies between say 220° and 250°, and a perfectly normal timing can be obtained when the inlet valve opens 240° after the exhaust valve. An example of timing suitable for a high speed engine for instance, is as follows:—

Exhaust valve opens 65° before bottom dead centre

Exhaust valve closes 5° after top dead centre

Inlet valve opens 5° before top dead centre

Inlet valve closes 65° after bottom dead centre.

With the above timing it will be seen that the inlet valve opens exactly 240° after the exhaust and since adjacent cylinders on a three cylinder radial engine fire at 240° intervals, the inlet of one cylinder is opening at exactly the same moment as the exhaust of another, and this factor is utilized in accordance with the present invention for simplifying the valve actuating mechanism.

Figure 1:
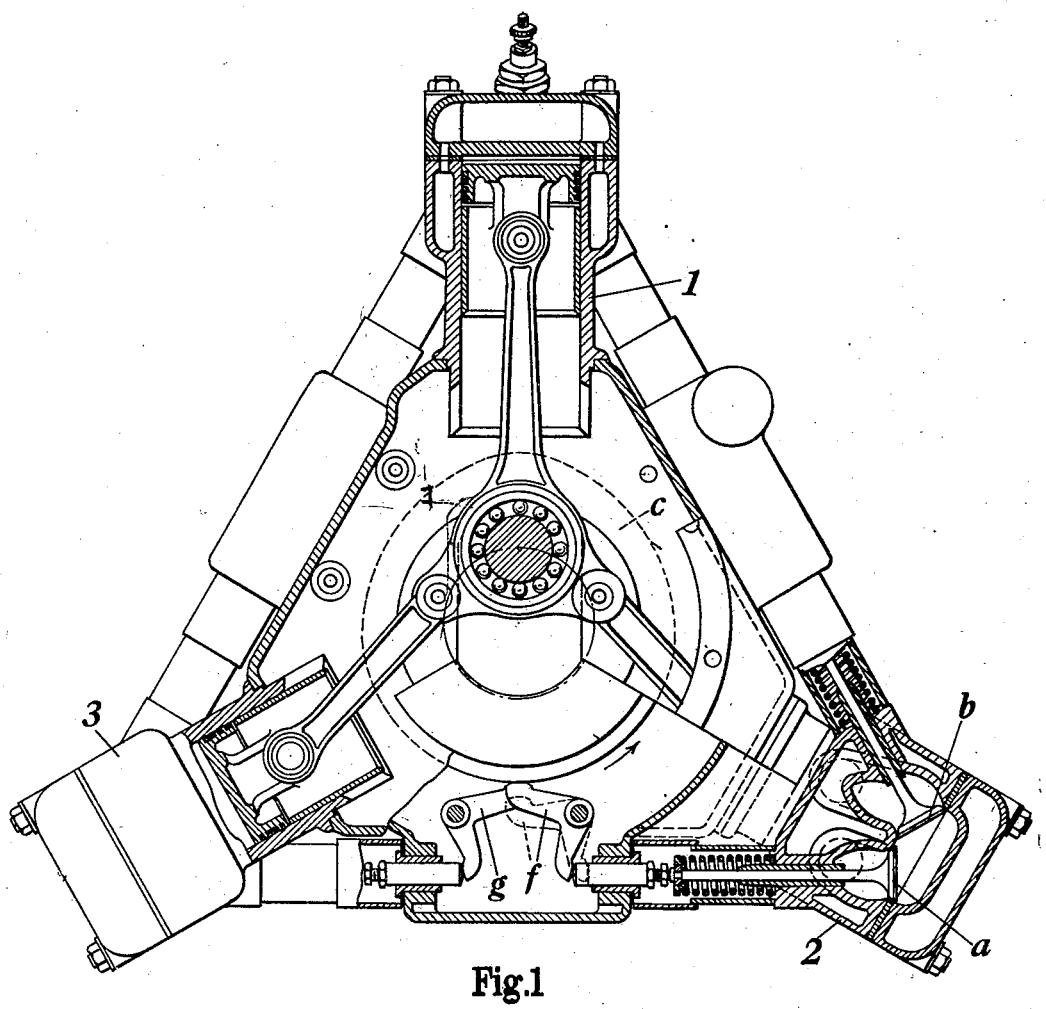
Figure 2:
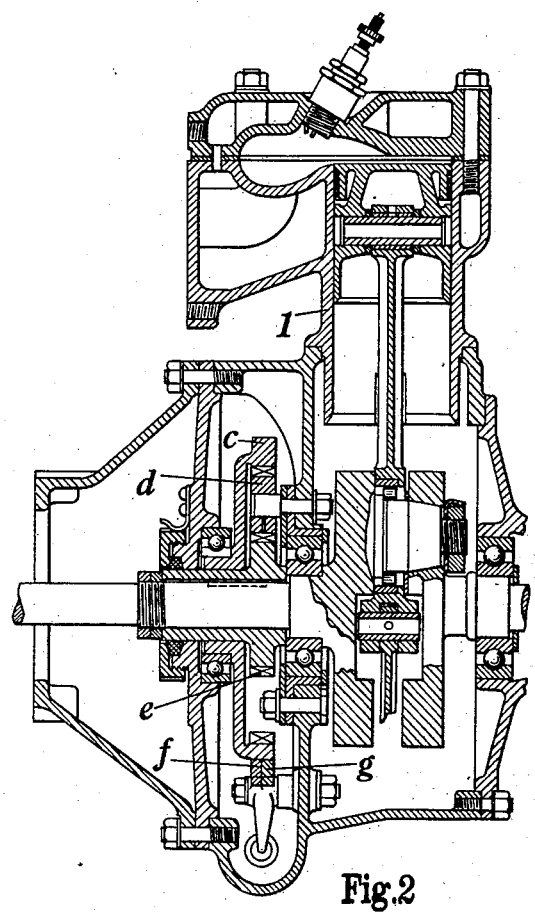

The accompanying drawings illustrate one convenient form of internal combustion engine in accordance with the invention, Figure 1 being a front elevation partly in section, while Figure 2 is a sectional side elevation.

In carrying the invention into effect in the manner illustrated, the engine comprises three cylinders designated respectively 1. 2. 3. in their proper order having regard to the direction of rotation of the crank shaft as indicated by the innermost arrows in Figure 1. The cylinders as shown are spaced equally apart from one another and each cylinder is provided as usual with an exhaust valve $a$ and an inlet valve $b$, the valves being conveniently adapted to be controlled by a cam operated tappet mechanism of suitable form and if necessary or desirable springs being provided for effecting return of the valves. In accordance with this invention the opening of the exhaust valve of any one cylinder is made to occur simultaneously with the opening of the inlet valve of the preceding cylinder (in the firing order 1, 3, 2,) and a single cam rotating in the opposite direction to the direction of the crank shaft or engine and at one half the engine speed is employed for actuating by means of the same part of the cam an inlet valve of one cylinder and an exhaust valve of an adjacent cylinder simultaneously three times in each rotation. The required motions may be transmitted from the cam to the valves by any convenient means. Thus, in the particular example illustrated in the drawings, the cam $c$ is adapted to be rotated from the crank shaft at one half the crank shaft speed and in the opposite direction by means of appropriate toothed gears $d$, $e$, and at each of the three operating positions of the cam I arrange a pair of levers $f$, $g$ adapted to actuate the tappet mechanisms respectively of the exhaust valve of one cylinder and the inlet valve of the next preceding or adjacent cylinder.

The invention is not to be limited to any particular means for driving the cam in the proper direction and at the appropriate speed, nor to any particular devices by which the cam may be made to operate upon the valves of the various cylinders in the manner hereinbefore indicated, since such details may be varied in accordance with any particular practical requirements.

Having thus described my invention what I claim as new and desire to secure by Letters Patent is:—

An internal combustion engine of the type referred to having a single cam whereof the same part is arranged to open simultaneously the exhaust valve of one cylinder and the inlet valve of the next preceding cylinder in the order of firing.

In testimony whereof I have signed my name to this specification.

FRANK WOOTTON HIGHFIELD.